United States Patent
Seok et al.

(10) Patent No.: US 11,924,911 B2
(45) Date of Patent: Mar. 5, 2024

(54) EXTREME-HIGH-THROUGHPUT FAST INITIAL LINK SETUP SUPPORT IN MULTI-LINK OPERATION IN WIRELESS COMMUNICATIONS

(71) Applicant: MediaTek Singapore Pte. Ltd., Singapore (SG)

(72) Inventors: Yongho Seok, San Jose, CA (US); James Chih-Shi Yee, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 17/325,788

(22) Filed: May 20, 2021

(65) Prior Publication Data

US 2021/0368322 A1 Nov. 25, 2021

Related U.S. Application Data

(60) Provisional application No. 63/028,801, filed on May 22, 2020.

(51) Int. Cl.
| | |
|---|---|
| *H04W 76/11* | (2018.01) |
| *H04W 8/00* | (2009.01) |
| *H04W 12/041* | (2021.01) |
| *H04W 12/069* | (2021.01) |
| *H04W 48/16* | (2009.01) |
| *H04W 80/02* | (2009.01) |

(52) U.S. Cl.
CPC ......... *H04W 8/005* (2013.01); *H04W 12/041* (2021.01); *H04W 12/069* (2021.01); *H04W 48/16* (2013.01); *H04W 76/11* (2018.02); *H04W 80/02* (2013.01)

(58) Field of Classification Search
CPC . H04W 8/005; H04W 12/041; H04W 12/069; H04W 48/16; H04W 76/11; H04W 80/02; H04W 76/15
See application file for complete search history.

(56) References Cited

U.S. PATENT DOCUMENTS

| | | | |
|---|---|---|---|
| 2013/0243194 A1* | 9/2013 | Hawkes | H04L 9/0838 380/270 |
| 2016/0165519 A1* | 6/2016 | Abraham | H04W 48/12 370/329 |
| 2020/0267541 A1* | 8/2020 | Huang | H04W 12/50 |
| 2020/0280909 A1* | 9/2020 | Gan | H04W 72/0453 |

(Continued)

FOREIGN PATENT DOCUMENTS

| | | |
|---|---|---|
| TW | 202110265 A | 3/2021 |
| WO | WO-2021011476 A1 * | 1/2021 ............ H04W 48/12 |

*Primary Examiner* — Lakeram Jangbahadur
(74) *Attorney, Agent, or Firm* — Han IP PLLC; Andy M. Han

(57) ABSTRACT

An access point (AP) multi-link device (MLD) and a non-AP station (STA) MLD perform a fast initial link setup (FILS) procedure to establish wireless communications over a plurality of links. The AP MLD and the non-AP STA MLD communicate over one or more links of the plurality of links upon completion of the FILS procedure with a FILS Discovery frame transmitted in the FILS procedure indicating whether a service set identifier (SSID) of the AP MLD is different from a SSID of an AP of a plurality of APs in the AP MLD transmitting the FILS Discovery frame.

19 Claims, 12 Drawing Sheets

(56) References Cited

U.S. PATENT DOCUMENTS

| | | | |
|---|---|---|---|
| 2020/0288523 A1* | 9/2020 | Patil | H04W 80/02 |
| 2021/0112451 A1* | 4/2021 | Patil | H04W 72/20 |
| 2021/0120602 A1* | 4/2021 | Huang | H04W 8/02 |
| 2021/0168115 A1* | 6/2021 | de la Oliva | H04L 61/5038 |
| 2021/0282007 A1* | 9/2021 | Ho | H04W 12/06 |
| 2022/0149991 A1* | 5/2022 | Gan | H04L 1/08 |

\* cited by examiner (A)

200

| Order | Information | Notes |
|---|---|---|
| 1 | Category | |
| 2 | Public Action | |
| 3 | FILS Discovery Information Field | |
| 4 | Reduced Neighbor Report Element | Optionally Present |
| 5 | FILS Indication Element | Optionally Present |
| 6 | Roaming Consortium Element | Optionally Present |

(B)

| FILS Discovery Frame Control | Timestamp | Beacon Interval | SSID / Short SSID | Length | FD Capability | Short MLD SSID |
|---|---|---|---|---|---|---|
| 2 | 8 | 2 | 1~32 | 0 or 1 | 0 or 2 | 0 or 4 |

Octets:

| Operating Class | Primary Channel | AP Configuration Sequence Number | Access Network Options | FD RSN Information | Channel Center Frequency Segment 1 | Mobility Domain |
|---|---|---|---|---|---|---|
| 0 or 1 | 0 or 1 | 0 or 1 | 0 or 1 | 0 or 5 | 0 or 1 | 0 or 3 |

Octets:

| BITS: | B0 | B1 | B2 B3 | B4 B5 | B6 B7 |
|---|---|---|---|---|---|
| | ESS | PRIVACY | BSS OPERATING CHANNEL WIDTH | | MAXIMUM NUMBER OF SPATIAL STREAM |
| | 1 | 1 | 3 | | 3 |

| BITS: | B8 | B9 | B10 B11 B12 | B13 B14 B15 |
|---|---|---|---|---|
| | MULTIPLE LINKS PRESENCE INDICATOR | MULTIPLE BSSIDS PRESENCE INDICATOR | PHY INDEX | FILS MINIMUM RATE |
| | 1 | 1 | 3 | 3 |

FIG. 3

| Element ID | Length | Element ID Extension | Key Type | FILS Public Key |
|---|---|---|---|---|
| 1 | 1 | 1 | 1 | Variable |

Octets:

| B0 | B1 | B2 | B3 | B4 | B5 | B6 | B7 |
|---|---|---|---|---|---|---|---|
| PREAUTHENTICATION | NO PAIRWISE | PTKSA REPLAY COUNTER | | GTKSA REPLAY COUNTER | | MFPR | MFPC |
| 1 | 1 | 2 | | 2 | | 1 | 1 |

Bits:

| B8 | B9 | B10 | B11 | B12 | B13 | B14 | B15 |
|---|---|---|---|---|---|---|---|
| JOINT MULTI-BAND RSNA | PEER KEY ENABLED | SPP A-MPDU CAPABLE | SPP A-MSDU REQUIRED | PBAC | EXTENDED KEY ID FOR INDIVIDUALLY ADDRESSED FRAMES | OCVC | RESERVED |
| 1 | 1 | 1 | 1 | 1 | 1 | 1 | 1 |

Bits:

FIG. 9

1200 

PERFORM A FAST INITIAL LINK SETUP (FILS) PROCEDURE TO ESTABLISH WIRELESS COMMUNICATIONS BETWEEN AN ACCESS POINT (AP) MULTI-LINK DEVICE (MLD) AND A NON-AP STATION (STA) MLD OVER A PLURALITY OF LINKS, WITH A FILS DISCOVERY FRAME TRANSMITTED IN THE FILS PROCEDURE INDICATING WHETHER A SERVICE SET IDENTIFIER (SSID) OF THE AP MLD IS DIFFERENT FROM A SSID OF AN AP OF A PLURALITY OF APS IN THE AP MLD TRANSMITTING THE FILS DISCOVERY FRAME
1210

COMMUNICATE OVER ONE OR MORE LINKS OF THE PLURALITY OF LINKS UPON COMPLETION OF THE FILS PROCEDURE
1220

FIG. 12

EXTREME-HIGH-THROUGHPUT FAST INITIAL LINK SETUP SUPPORT IN MULTI-LINK OPERATION IN WIRELESS COMMUNICATIONS

CROSS REFERENCE TO RELATED PATENT APPLICATION

The present disclosure is part of a non-provisional patent application claiming the priority benefit of U.S. Provisional Patent Application No. 63/028,801, filed on 22 May 2020, the content of which being incorporated by reference in its entirety.

TECHNICAL FIELD

The present disclosure is generally related to wireless communications and, more particularly, to extreme-high-throughput (EHT) fast initial link setup (FILS) support in multi-link operation in wireless communications.

BACKGROUND

Unless otherwise indicated herein, approaches described in this section are not prior art to the claims listed below and are not admitted as prior art by inclusion in this section.

In a wireless local area network (WLAN), a station (STA) needs to discover an access point (AP) first to establish communications (e.g., transmit and receive data) with the AP. Under the current Institute of Electrical and Electronics Engineers (IEEE) 802.11 Specification, an AP can broadcast a FILS discovery beacon to facilitate discovery of the AP by STA(s) within a communication range to set up a communication link with the AP. Link setup typically involves a discovery procedure, an authentication procedure, and an association procedure. An FILS discovery frame is used in the disclosure procedure. However, some modification to the FILS discovery frame, as currently defined, is necessary in order to support multi-link operation when the AP is an AP multi-link device (MLD) and/or the STA is a STA MLD. For instance, for an AP MLD, while an AP in the AP MLD has its own service set identifier (SSID), the AP MLD can have an MLD-level SSID that is different from the SSID of the AP. Accordingly, the FILS discovery frame, as currently defined, needs to be modified to indicate such information. Moreover, some modifications to the current IEEE Specification are needed to support EHT FILS in multi-link operations.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to EHT FILS support in multi-link operation in wireless communications. Under various proposed schemes in accordance with the present disclosure, issues described herein may be addressed.

In one aspect, a method may involve performing a FILS procedure to establish wireless communications between an AP MLD and a non-AP STA MLD over a plurality of links. The method may also involve communicating over one or more links of the plurality of links upon completion of the FILS procedure. A FILS Discovery frame transmitted in the FILS procedure may indicate whether a SSID of the AP MLD is different from a SSID of an AP of a plurality of APs in the AP MLD transmitting the FILS Discovery frame.

In another aspect, an apparatus may include a transceiver configured to communicate wirelessly and a processor coupled to the transceiver. The processor may performing, via the transceiver, a FILS procedure to establish wireless communications between an AP MLD and a non-AP STA MLD over a plurality of links. The processor may also communicate, via the transceiver, over one or more links of the plurality of links upon completion of the FILS procedure. A FILS Discovery frame transmitted in the FILS procedure may indicate whether a service set identifier (SSID) of the AP MLD is different from a SSID of an AP of a plurality of APs in the AP MLD transmitting the FILS Discovery frame.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, $5^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 2 is a diagram of an example design in accordance with an implementation of the present disclosure.

FIG. 3 is a diagram of an example design in accordance with an implementation of the present disclosure.

FIG. 4 is a diagram of an example design in accordance with an implementation of the present disclosure.

FIG. 9 is a diagram of an example design in accordance with an implementation of the present disclosure.

FIG. 12 is a flowchart of an example process in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to EHT FILS support in multi-link operation in wireless communications. According to the present disclosure, a number of possible solutions may be implemented separately or jointly. That is, although these possible solutions may be described below separately, two or more of these possible solutions may be implemented in one combination or another.

Figure 1:
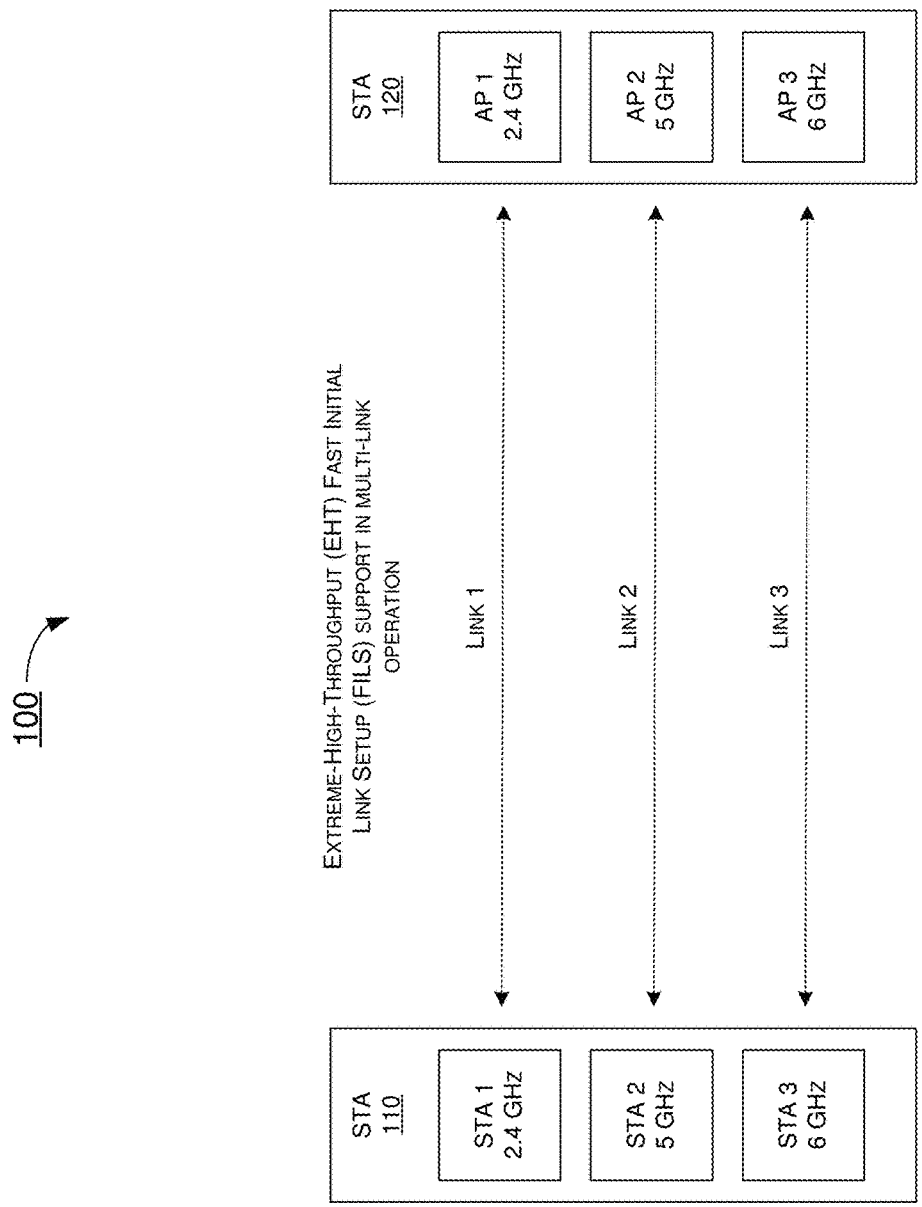
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 12 illustrate examples of implementation of various proposed schemes in network environment 100 in accordance with the present disclosure. The following description of various proposed schemes is provided with reference to FIG. 1~FIG. 12.

Referring to FIG. 1, network environment 100 may involve a STA 110 and a STA 120 communicating wirelessly over multiple links (e.g., link 1, link 2 and link 3) in accordance with one or more Institute of Electrical and Electronics Engineers (IEEE) 802.11 standards such as IEEE 802.11 be and beyond. Each of STA 110 and STA 120 may function as an MLD. For instance, STA 110 may function as a non-AP MLD with multiple virtual STAs (e.g., STA 1, STA 2 and STA 3) operating within STA 110. Correspondingly, STA 120 may function as an AP MLD with multiple virtual APs (e.g., AP 1, AP 2 and AP 3) operating within STA 120. Under various proposed schemes in accordance with the present disclosure, STA 110 and STA 120 may be configured to perform EHT FILS support in multi-link operation in wireless communications according to various proposed schemes described herein.

FIG. 2 illustrates an example design 200 of a FILS Discovery frame under a proposed scheme in accordance with the present disclosure. Referring to part (A) of FIG. 2, a FILS Discovery frame may include various information fields, including a FILS Discovery Information field. Referring to part (B) of FIG. 2, among the various information fields in the FILS Discovery Information field, there may be a FILS Discovery (FD) Capability subfield. The FD Capability subfield may include several subfields, including a Multiple Links Presence Indicator subfield, which may indicate whether an AP (e.g., STA 120) transmitting the FILS Discovery frame supports multi-link operation as a part of an AP MLD. For instance, the Multiple Links Presence Indicator subfield may be set to 1 to indicate that a Multiple Links element is present in the Beacon and Probe Response frames. On the other hand, the Multiple Links Presence Indicator subfield may be set to 0 to indicate that the Multiple Links element is not present in the Beacon and Probe Response frames.

FIG. 3 illustrates an example design 300 of a FD Capability subfield under a proposed scheme in accordance with the present disclosure. Referring to FIG. 3, the FD Capability subfield may include various subfields, including a Multiple Links Presence Indicator subfield Under the proposed scheme, when the Multiple Links Presence Indicator subfield in the FD Capability subfield in the FILS Discovery Information field is set to 1 and the AP MLD has an AP MLD SSID which is different from a SSID of an AP (e.g., AP1, AP2 or AP3 of STA 120) transmitting the FILS Discovery frame, then the FILS Discovery Information field may also include a Short MLD SSID subfield, as shown in part (B) of FIG. 2. The Short MLD SSID subfield may contain a 4-octet Short SSID of the AP MLD (e.g., as defined in Section 9.4.2.170 (Reduced Neighbor Report element) of the IEEE Specification).

Under a proposed scheme in accordance with the present disclosure with respect to higher-layer protocol (HLP) encapsulation, a FILS HLP Container element may be used for encapsulating HLP packets. Under the proposed scheme, in case that a non-AP STA MLD (e.g., STA 110) uses HLP encapsulation, the non-AP STA MLD may construct a FILS HLP Container element for each HLP packet. The non-AP STA MLD may then place multiple FILS HLP Container elements into an Association (or Reassociation) Request frame as long as they fit within the size limit of a Medium Access Control (MAC) Management Protocol Data Unit (MMPDU). The HLP packet in the FILS HLP Container element may contain any MAC Service Data Unit (MSDU) format (e.g., as defined in Section 5.1.4 (MSDU format) of the IEEE Specification). Under the proposed scheme, an encapsulation procedure may involve the non-AP STA MLD filling one or more FILS HLP Container elements with a destination MAC address, a source MAC address of the HLP packet, and the HLP packet in MSDU format. The source MAC address may be the MLD MAC address of the non-AP STA MLD. The encapsulation procedure may also involve the non-AP STA MLD including the FILS HLP Container element(s) into an Association (or Reassociation) Request frame.

Under the proposed scheme, in case an AP MLD (e.g., STA 120) receives an Association (or Reassociation) Request frame that includes FILS HLP Container element(s), the AP MLD may decapsulate the HLP packet(s) but may not transfer the HLP packet(s) until a key confirmation (e.g., as defined in Section 12.12.2.6 (Key confirmation with FILS authentication) of the IEEE Specification) is successfully completed. After successful key confirmation, the AP MLD may forward the HLP packet(s) to an upstream network or basic service set (BSS) according to the destination MAC address of the HLP packet(s). The order of forwarding the HLP packets may be the same as the order of the FILS HLP Container elements in the Association (or Reassociation) Request frame. In case the key confirmation fails, the AP MLD may discard the HLP packet(s), and the AP MLD may also filter the HLP packet(s) based on certain rules.

Under the proposed scheme, a packet encapsulation procedure for each FILS HLP Container element may involve the AP MLD extracting the destination MAC address, the source MAC address, and the HLP packet from a given FILS HLP Container element. Then, the procedure may involve the AP verifying that the extracted source MAC address is equal to the MLD MAC address of a non-AP STA MLD (e.g., STA 110) associated with the source MAC address of the Association (or Reassociation) Request frame. In case those addresses are different, the AP may discard the FILS HLP Container element. Next, the procedure may involve the AP constructing a frame in appropriate format to deliver the HLP packet to the upstream network or BSS by using the extracted destination MAC address, the extracted source MAC address, and the HLP packet.

Under the proposed scheme, the AP MLD may wait to transmit an Association (or Reassociation) Response frame until a predefined duration, such as dot11HLPWaitTime, has elapsed after receiving the Association (or Reassociation) Request frame. In an event that, before transmitting the Association (or Reassociation) Response frame, the AP MLD receives one or more HLP packets from the upstream network or BSS that has/have the MLD MAC address of the non-AP STA MLD or a group address as the destination address, the AP MLD may transmit each HLP packet in a different FILS HLP Container element in the Association (or Reassociation) Response frame. The order of the FILS HLP Container elements in the Association (or Reassociation) Response frame may be the same as the order of reception of the HLP packets. In case the AP MLD receives HLP packets for the non-AP STA MLD after transmitting the Association (or Reassociation) Response frame, the AP MLD may transmit the HLP packets as Data frames. In an event that, before transmitting the Association (or Reassociation) Response frame, the AP does not receive any HLP packet from the upstream network or BSS that has the MLD MAC address of the non-AP STA MLD or a group address as the destination address, the AP MLD may not transmit any FILS HLP Container element in the Association (or Reassociation) Response frame. Under the proposed scheme, the status code in the Association (or Reassociation) Response frame may not be affected by the presence or absence of a FILS HLP Container element.

Under a proposed scheme in accordance with the present disclosure with respect to HLP encapsulation, a packet encapsulation procedure for each FILS HLP Container element by an AP MLD (e.g., STA 120) may involve certain operations. Firstly, the AP MLD may set the fields of the HLP Container element in a certain way. For instance, the AP MLD may set the Destination MAC Address field to the destination MAC address of the received HLP packet, which may be the MLD MAC address of a non-AP STA MLD (e.g., STA 110) or a group address. In case the destination MAC address of the received HLP packet is different from the MLD MAC address of the non-AP STA MLD but is equal to one of the wireless medium (WM) MAC addresses of the non-AP STA MLD, the Destination MAC Address field may be set to the MLD MAC address of the non-AP STA MLD. Moreover, the AP MLD may set the Source MAC Address field to the source MAC address of the received HLP packet. Furthermore, the AP MLD may set the HLP Packet field to the HLP packet in MSDU format. Then, the AP MLD may include the FILS HLP Container element(s) in an Association (or Reassociation) Response frame. Next, the AP MLD may transmit the Association (or Reassociation) Response frame.

Under a proposed scheme in accordance with the present disclosure with respect to HLP encapsulation, in case a non-AP STA MLD (e.g., STA 110) receives an the Association (or Reassociation) Response frame with one or more FILS HLP Container elements, the non-AP STA MLD may perform key confirmation first. After successful key confirmation, the non-AP STA MLD may generate an MA-UNITDATA.indication primitive for each HLP packet. The order of generating MA-UNITDATA.indication primitive of the HLP packets may be the same as the order of the FILS HLP Container elements in the Association (or Reassociation) Response frame. In case the key confirmation fails, the non-AP STA MLD may discard the HLP packet(s).

Under a proposed scheme in accordance with the present disclosure with respect to HLP encapsulation, a packet encapsulation procedure for each FILS HLP Container element by a non-AP STA MLD (e.g., STA 110) may involve certain operations. Firstly, the non-AP STA MLD may extract the destination MAC address, source MAC address, and the HLP packet. Then, the non-AP STA MLD may verify that the extracted destination MAC address is equal to the MLD MAC address of the non-AP STA MLD or a group address. In case that the destination MAC address is not for the non-AP STA MLD, the non-AP STA MLD may discard the FILS HLP Container element. Next, the non-AP STA MLD may generate an MA-UNITDATA.indication primitive with a number of parameters including, for example and without limitation: a source address (the extracted source MAC address), a destination address (the extracted destination MAC address), routing information (all), data (the extracted HLP packet), reception status (success), priority (Contention), and service class (which may be quality of service acknowledgement (QoSAck), when the destination address is an individual address, or quality of service negative acknowledgement (QoSNoAck), when the destination address is not an individual address).

Under a proposed scheme in accordance with the present disclosure with respect to FILS Public Key element, all APs (e.g., AP1, AP2 and AP3 in STA 120) in the AP MLD may use one public key across multiple links (e.g., link 1, link 2 and link 3), and all non-AP STAs (e.g., STA1, STA2 and STA3 in STA 110) in the non-AP STA MLD may use one public key across the multiple links. Under the proposed scheme, Diffie-Hellman values in all APs in the AP MLD may be common across the multiple links. Similarly, the Diffie-Hellman values in all non-AP STAs in the non-AP STA MLD may be common across the multiple links.

Under the proposed scheme, a FILS Public Key element may be used to communicate the (certified) public key of a device for use with a FILS authentication exchange. FIG. 4 illustrates an example design 400 of a FILS Public Key element under the proposed scheme. Referring to FIG. 4, the FILS Public Key element may include an Element ID field, a Length field, and Element ID Extension field (e.g., as defined in Section 9.4.2.1 (General) of the IEEE Specification). The FILS Public Key element may also include a Key Type field which may have different values. For instance, the Key Type field may be set to 1 to indicate that the FILS Public Key field contains an X.509v3 certificate encoded according to Internet Engineering Task Force (IETF) Request for Comments (RFC) 5280. The Key Type field may be set to 2 to indicate that the FILS Public Key field contains an uncertified public key encoded according to IETF RFC 5480. The Key Type field may be set to 3 to indicate that the FILS Public Key field contains an uncertified public key encoded according to IETF RFC 3279. Values 0 and 4~255 for the Key Type field may be reserved.

Under a proposed scheme in accordance with the present disclosure with respect to key establishment with FILS Shared Key authentication, the non-AP STA MLD and AP MLD may perform key establishment using Authentication frames and perform key confirmation using Association (or Reassociation) Request and Association (or Reassociation) Response frames. In case the non-AP STA MLD chooses to initiate FILS Shared Key authentication, the non-AP STA MLD may first choose a random 16-octet nonce and then determine whether to attempt Pairwise Master Key Securing Association (PMKSA) caching. In case PMKSA caching is attempted, the non-AP STA MLD may generate a list of PMKSA identifiers. In case the non-AP STA MLD attempts to initiate an Extensible Authentication Protocol (EAP) registration procedure (EAP-RP), the non-AP STA MLD may construct an EAP-initiate/Re-auth packet per IETF RFC 6696 with certain clarifications. For instance, regarding EAP-RP Flags, the B flag may be set to 0 to indicate that this is not an EAP-RP bootstrap message, the L flag may be set to 1 to indicate that the Trusted Third Party (TTP) with whom the STA shares the rRK is to provide the lifetimes of rRK and rMSK in the EAP-Finish/Re-auth packet. Moreover, the EAP Identifier may be set to 0, and the Cryptosuite field may not be set to 1. Under the proposed scheme, in case Perfect Forward Secrecy (PFS) is desired, the non-AP STA MLD may select a finite cyclic group frame the dot11RSNAConfigDLCGroupTable. This may involve identifying a number from a repository maintained by the Internet Assigned Numbers Authority (IANA) as "Group Description" attributes for IETF RFC 2409 (IKE). The STA MLD may then generate an ephemeral private key and perform the group's scalar-op (e.g., as per Section 12.4.4.1 (General) of the IEEE Specification) with its random ephemeral private key and the generator from the selected finite cyclic group to compute an ephemeral public key.

Under the proposed scheme, the non-AP STA MLD may construct an Authentication frame in a certain way. For instance, the non-AP STA MLD may set the Authentication algorithm number to 4 (for FILS Shared Key authentication without PFS) or 5 (for FILS Shared Key authentication with PFS) (e.g., as defined in Section 9.4.1.1 (Authentication Algorithm Number field) of the IEEE Specification) depending on whether PFS is used. The non-AP STA MLD may also set the Authentication transaction sequence number to 1. The random nonce may be encoded in the FILS Nonce element (e.g., as defined in Section 9.4.2.189 (FILS Nonce element (11ai)) of the IEEE Specification). In case a list of PMKSA identifiers was generated, the non-AP STA MLD may use the list to construct a PMKID List field in Robust Security Network element. The random FILS Session may be encoded in the FILS Session element (e.g., as defined in Section 9.4.2.179 (FILS Session element (11ai)) of the IEEE Specification). The EAP-Initiate/Re-authentication packet, if generated, may be copied into the FILS Wrapped Data field (e.g., as defined in Section 9.4.2.187 (FILS Wrapped Data element (11ai)) of the IEEE Specification). In case PFS is desired, the chosen finite cyclic group may be encoded in the Finite Cyclic Group field (e.g., as defined in Section 9.4.1.42 (Finite Cyclic Group field) of the IEEE Specification) and the ephemeral public key may be encoded in the FFE field (e.g., as defined in Section 9.4.1.40 (FFE field) of the IEEE Specification) according to the element to octet-string conversion in Section 12.4.7.2.4 (Element to octet string conversion) of the IEEE Specification. Moreover, the wireless medium (WM) MAC addresses (including the STA MLD address) for each link of the supported multiple links and the MLD MAC address may be encoded in the Multiple Link Address element. After constructing the Authentication frame, the non-AP STA MLD may transmit the Authentication frame to the AP MLD.

Under the proposed scheme, in case PMKSA caching is not used and the AP MLD is not connected to, or does not recognize the Authentication Server identified by the non-AP STA MLD using the realm in the key Name-NAI field of the EAP-Initiate/Re-auth packet, then the AP MLD may send an Authentication frame with a Status Code field set to 113 to indicate "Authentication rejected due to unknown Authentication Server" to the non-AP STA MLD. Otherwise, the AP MLD may generate its own nonce and construct an Authentication frame for the non-AP STA MLD. The AP MLD may copy the FILS Session element from the Authentication frame sent by the non-AP STA MLD to this response Authentication frame. In case PMKSA caching is not used, this frame may contain the FILS wrapped data that encapsulates EAP-Finish/Re-auth packet received from the Authentication Server. Additionally, in case PFS is used, the FFE field of the Authentication frame sent by the AP MLD may contain the AP MLD's ephemeral public key. In this frame, the AP MLD may set the Authentication algorithm number to 4 or 5 depending on whether PFS is used, and the AP MLD may set the Authentication sequence number to 2. In case PMKSA caching is used, the AP may indicate the selected PMKID in the PMKID List. In case PFS is being used for the exchange, the AP MLD may perform the group's scalar-op (e.g., as defined in Section 12.4.4.1 (General) of the IEEE Specification) with the STA MLD's ephemeral public key and its own ephemeral private key to produce an ephemeral Diffie-Hellman shared secret, DHss. Under the proposed scheme, the AP MLD may encode the WM MAC addresses (including AP MLD address) for each link of the supported multiple links and the MLD MAC address of the AP MLD in the Multiple Link Address element, and the AP MLD may include the Multiple Links Address element in the Authentication frame. Moreover, the AP MLD may transmit the Authentication frame to the non-AP STA MLD. Upon transmission of the FILS Authentication frame, the AP may proceed to key establishment per Section 12.12.2.5 (Key establishment with FILS authentication) of the IEEE Specification.

Under the proposed scheme, the Pairwise Master Key (PMK) may be derived using the two nonces and the secret(s) from FILS Key establishment. A PMK identifier (PMKID) used to identify the PMKSA may be generated using a hash algorithm from a negotiated Authentication and Key Management (AKM) on input data specific to the FILS Key establishment. The length of the PMK may be either 256 bits or 384 bits depending on the negotiated AKM, and the length of the PKMID may be 128 bits. In case FILS Shared Key authentication is used to generate the input keying material, then the PMK and PMKID may be derived as follows:

PMK=HMAC–Hash(SNonce‖ANonce, rMSK [‖DHss])

PMKID=Truncate–128 (Hash(EAP–Initiate/Reauth))

When FILS Public Key authentication is used to generate input keying material, the PMK and PMKID may be derived as follows:

PMK=HMAC–Hash (SNonce‖ANonce, DHss]) (MLD-level)

PMKID=Truncate–128 (Hash(gSTA‖gAP)) (MLD-level)

Here, SNonce denotes the STA MLD nonce and ANonce denotes the AP MLD nonce. Additionally, rMSK denotes the shared secret from the EAP-RP exchange, and DHss denotes the shared secret derived from the Diffie-Hellman exchange when performed since, when Elliptic Curve Cryptography (ECC) is used, only the x-coordinate from Elliptic Curve Diffie-Hellman (ECDH) is included. The brackets indicate the inclusion of the shared secret when performing a Diffie-Hellman exchange, or there is no shared secret to include otherwise. EAP-Initiate/Reauth denotes the EAP-RP packet sent by the STA using key establishment with FILS Shared Key authentication. Moreover, gSTA denotes the STA MLD's Diffie-Hellman value, and gAP denotes the AP MLD's Diffie-Hellman value. Hash denotes the hash algorithm specific to the negotiated AKM (see Table 9-151 (AKM suite selectors) of the IEEE Specification).

For Pairwise Transient Key Security Association (PTKSA) key generation, the inputs to the pseudo-random function (PRF) may be the PMK of the PMKSA, a constant label, and a concatenation of the STA MLD MAC address, the AP MLD MAC address, the STA MLD's nonce, and the AP MLD's nonce. When the negotiated AKM is 00-0F-AC: 14 or 00-0F-AC:16, the length of Key Encryption Key (KEK) may be 256 bits, and the length of the Integrity Check Value Key (ICK) shall be 256 bits. When the negotiated AKM is 00-0F-AC:15 or 00-0F-AC:17, the length of the KEK shall be 512 bits, and the length of ICK may be 384 bits. When the negotiated AKM is 00-0FAC:16, FILS-FT may be 256 bits. When the negotiated AKM is 00-0F-AC:17, FILS-FT may be 384 bits; otherwise, FILS-FT is not derived. The total amount of bits extracted from the key derivation function (KDF) may therefore be 512+TK bits, 896+TK bits, or 1280+TK bits depending on the negotiated AKM, where TK bits are determined as follows:

FILS-Key-Data=PRF-X(PMK, "FILS PTK KDerivation", SPR∥AA∥SNonce∥ANonce [∥DHss])
ICK=L(FILS-Key-Data, 0, ICK_bits)
KEK=L(FILS-Key-Data, ICK_bits, KEK_bits)
TK=L(FILS-Key-Data, ICK_bits+KEK_bits)

When performing fast transition (FT) initial mobility domain association using FILS authentication, the FILS-FT may be determined as follows:

FILS-FT=L(FILS-Key-Data, ICK_bits+KEK_bits+TK_bits, FILS-FT_bits)

Here, ICK_bits denotes the length of ICK in bits, KEK_bits denotes the length of KEK in bits, FILS-FT_bits denotes the length of FILS-FT in bits when performing FT initial mobility domain association using FILS authentication. X may be 512+TK bits, 768+TK bits, 896+TK bits or 1280+TK bits from Table 12-7 (Cipher suite key lengths) of the IEEE Specification depending on the negotiated AKM. PMK denotes the PMK from the PMKSA, either created from an initial FILS connection or from a cached PMKSA, when PMKSA caching is used. When performing FT initial mobility domain association using FILS authentication, it is equal to the Maser PMK (MPMK) (e.g., as defined in Section 12.7.1.6.3 (PMKR0) of the IEEE Specification). SPA denotes the STA MLD MAC address, AA denotes the AP MLD MAC address, ANonce denotes the STA MLD's nonce, ANonce denotes the AP MLD's nonce, DHss denotes the shared secret derived from the Diffie-Hellman exchange, when performed, and PMKSA caching is used. Moreover, the brackets indicate the inclusion of the shared secret when performing a Diffie-Hellman exchange while using PMKSA caching, and there is no shared secret to indicate otherwise. Upon completion of FILS-Key-Data generation, the shared secret, DHss, may be irretrievably deleted in case Diffie-Hellman exchange was performed.

Under a proposed scheme in accordance with the present disclosure with respect to Association (or Reassociation) Request for FILS key confirmation, key confirmation for FILS authentication may be a (Re)Association Request frame followed by a (Re)Association Response frame. Components of the (Re)Association Request and (Re)Association Response frames may be protected using KEK. The STA MLD may construct a (Re)Association Request frame for FILS authentication (e.g., as per Section 9.3.3.5 (Association Request frame format) and Section 9.3.3.7 (Reassociation Request frame format) of the IEEE Specification). Hash algorithms may be used to generate the FILS Key Confirmation element and the specific hash algorithm may depend on the negotiated AKM (e.g., as per Section 9.4.2.24.3 (AKM suites) of the IEEE Specification).

Under the proposed scheme, for FILS Shared Key authentication and FILS Public Key authentication when using PMKSA caching, the KeyAuth field of the FILS Key Confirmation element may be constructed by using the Hash-Based Message Authentication Code (HMAC) mode of the negotiated hash algorithm with a key of ICK on a concatenation of the STA MLD's nonce, the AP MLD's nonce, the STA MLD MAC address, the AP MLD MAC address, and conditionally the STA MLD's public Diffie-Hellman value and the AP MLD's public Diffie-Hellman value, in that order and as follows:

Key-Auth=HMAC-Hash(ICK, SNonce∥ANonce∥STA-MLD-MAC∥AP-MLD-MAC [∥ gSTA∥gAP])

Here, Hash denotes the hash algorithm specific to the negotiated AKM (see Table 9-151 (AKM suite selectors) of the IEEE Specification), SNonce denotes the STA MLD's nonce, ANonce denotes the AP MLD's nonce, STA-MLD-MAC denotes the MLD MAC address of the STA MLD, AP-MLD-MAC denotes the MLD MAC address of the AP MLD, gSTA denotes the STA MLD's Diffie-Hellman public value, gAP denotes the AP MLD's Diffie-Hellman public value, and the brackets indicate the inclusion of the Diffie-Hellman public values when performing PFS with FILS Shared Key authentication or PMKSA caching with FILS Public Key authentication. There is no Diffie-Hellman public values to include otherwise.

For FILS Public Key authentication when PMKSA caching is not used, the KeyAuth field of the FILS Key Confirmation element may be a digital signature using the STA MLD's private key of the negotiated hash algorithm on a concatenation of the STA MLD's public Diffie-Hellman value, the AP MLD's public Diffie-Hellman value, the STA MLD's nonce, the AP MLD's nonce, the STA MLD MAC address, and the AP MLD MAC address, in that order and as follows:

Key-Auth=Sig-STA (gSTA∥gAP∥SNonce∥ANonce∥STA-MLD-MAC∥AP-MLD-MAC)

Here, Sig-STA( ) indicates a digital signature using the STA MLD's private key, analogous to the STA MLD's trusted public key. The form of signature may depend on the type of public key used by the STA MLD (IETF RFC 3447 for RSA, FIPS 186-4 for DSA, and ISO/IEC 14888-3 for ECDSA). The data to be signed may be first hashed and the hash algorithm used with the appropriate digital signature algorithm may be specific to the negotiated AKM.

Under the proposed scheme, the (Re)Association Request frame may be encrypted using the Authenticated Encryption with Associated Data (AEAD) algorithm (e.g., as defined in Section 12.12.2.7 (AEAD cipher mode for FILS) of the IEEE Specification) with the KEK as the key. The Additional Authentication Data (AAD) used with the AEAD algorithm for the Association Request frame may include the following data passed as separate components in the following order: (i) STA's MAC address, (ii) AP's basic service set identifier (BSSID), (iii) STA's nonce, (iv) AP's nonce, and (v) the contents of the (Re)Association Request frame from the Capability Information field (inclusive) to the FILS session element (inclusive). Additionally, the Additional Authentication Data (AAD) used with the AEAD algorithm for the Association Request frame may include (vi) STA MLD MAC address and (vii) AP MLD MAC address. The plaintext passed to the AEAD algorithm may be the data that would follow the FILS Session element in an unencrypted frame body. The output of the AEAD algorithm may become the data that follows the FILS Session element in the encrypted and authenticated (Re) Association Request frame. The output of the algorithm may be as specified in IETF RFC 5116. The resulting (Re) Association Request frame may be transmitted to the AP MLD. The AP MLD may compare FILS session of the received (Re)Association Request frame with the FILS session that was used to identify the FILS session in the Authentication frames. If they differ, authentication exchange fails.

Under the proposed scheme, the AP MLD may decrypt and verify the received (Re)Association Request frame with the AEAD algorithm (e.g., as defined in Section 12.12.2.7 (AEAD cipher mode for FILS) of the IEEE Specification) with the KEK as the key. The AAD may be reconstructed as defined above and may be passed, along with the ciphertext of the received frame, to the AEAD decryption operation. In case the output from the AEAD decryption operation returns a failure, the authentication exchange fails. In case the output does not return failure, the output plaintext may replace the ciphertext as portion of the frame body that follows the FILS Session element and processing of the received frame may continue by checking the value of the FILS Key Confirmation element. The AP MLD may verify that the RSNE received in the (Re)Association Request frame has identical AKM suite and cipher suites and RSN capabilities as were included in the RSNE in the Authentication frame from the STA MLD. If these fields differ, the authentication exchange fails. For FILS Shared Key authentication, the AP MLD may construct a verifier, Key-Auth', in an identical manner as the STA MLD constructed its Key-Auth above. The AP MLD may compare Key-Auth' with the KeyAuth field in the FILS Key Confirmation element of the received frame. If they differ, authentication fails.

For FILS Public Key authentication, the AP MLD may use the STA MLD's (certified) public key from the FILS Public Key element to verify that the signature contained in the KeyAuth field corresponds to the purported signature by the STA MLD over the concatenation of the following: STA's public Diffie-Hellman value (gSTA), AP's public Diffie-Hellman value (gAP), STA's nonce (SNonce), AP's nonce (ANonce), STA's MAC address (STA-MAC), and AP's BSSID (AP-BSSID) in that order, according to the signature scheme used. Furthermore, the AP MLD may check all certificates in the certificate chain, both cryptographically and from a security policy perspective, according to the procedures for checking certificates and certificate chains in IETF RFC 5280. If any of these verifications fail, authentication fails.

Under the proposed scheme, in case authentication is deemed a failure, ICK, KEK, TK, and the PTKSA may be irretrievably deleted and the AP MLD may return an Authentication frame with a status code set to 112 to indicate "Authentication rejected due to FILS authentication failure." In case PMKSA caching was not being employed for this failed authentication attempt, the PMKSA may also be deleted. In case PMKSA caching was being employed, the reason for failure may be an impersonation attack. Therefore, when FILS with PMKSA caching fails, the AP MLD may decide to retain the cached PMKSA.

Under a proposed scheme in accordance with the present disclosure with respect to (Re)Association Response for FILS key confirmation, the AP MLD may construct a (Re)Association Response frame for FILS authentication (e.g., as per Section 9.3.3.6 (Association Response frame format) and Section 9.3.3.8 (Reassociation Response frame format) of the IEEE Specification). As with the (Re)Association Request frame, hash algorithms may be used to generate the FILS Key Confirmation element and the specific hash algorithm may depend on the negotiated AKM (see 9.4.2.24.3 (AKM suites)). Additionally, the AP MLD may construct a Key Delivery element indicating the current Group Temporal Key (GTK) and Key receive sequence counter (RSC) for each link of the multiple links, the current Integrity Group Temporal Key (IGTK) and IGTK packet number (IPN) for each link of the multiple links in case management frame protection is enabled, and the current Beacon Integrity Group Temporal Key (BIGTK) and BIGTK packet number (BIPN) for each link of the multiple links in case beacon protection is enabled. The AP MLD may put the Key Delivery element into the (Re)Association Response frame.

Figure 5:
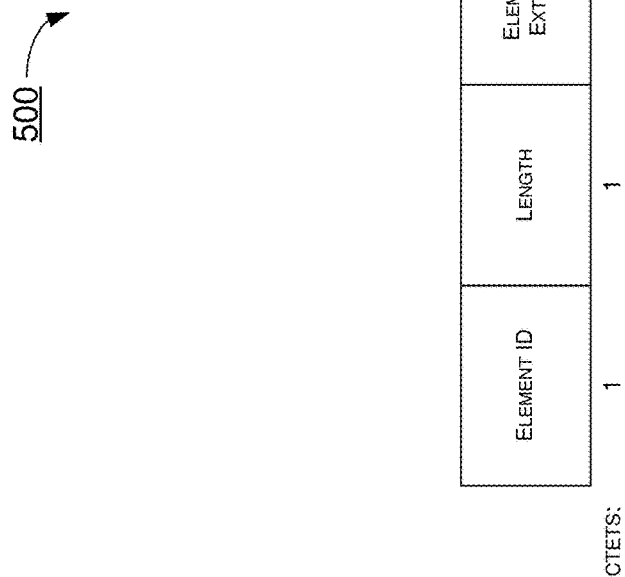
FIG. 5 is a diagram of an example design in accordance with an implementation of the present disclosure.

FIG. 5 illustrates an example design 500 of a Key Delivery element under a proposed scheme in accordance with the present disclosure. Referring to FIG. 5, the Key Delivery element may include a number of fields including, for example, an Element ID field, a Length field, an Element ID Extension field, a Key RSC field, and a Key Data Encapsulation (KDE) List field. The Key RSC field may contain the receive sequence counter for the GTK being installed to the same link on which the Key Delivery element is transmitted. The KDE List field may contain one or more KDEs encapsulated using a predefined format. For instance, the KDE List field may include a GTK KDE, an IGTK KDE and a BIGTK KDE for the same link on which the Key Delivery element is transmitted. Moreover, the KDE List field may include a Multi-Link GTK KDE, a Multi-Link IGTK KDE and a Multi-Link BIGTK KDE for different link(s) on which the Key Delivery element is transmitted.

Figure 6:
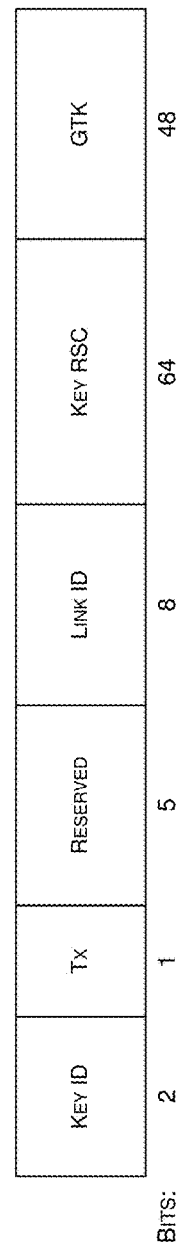
FIG. 6 is a diagram of an example design in accordance with an implementation of the present disclosure.

FIG. 6 illustrates an example design 600 of a Multi-Link GTK KDE element under a proposed scheme in accordance with the present disclosure. Referring to FIG. 6, the Multi-Link GTK KDE element may include a number of fields including, for example, a Key ID field, a Transmit (Tx) field, a Reserved field, a Link ID field, a Key RSC field, and a GTK field. The Key ID field may indicate the value of the GTK key identifier. The Tx field may indicate the link on which the GTK is transmitted. In case the value of Tx field is 1, then the IEEE 802.1X component may configure the temporal key derived from the KDE into tis IEEE 802.11 MAC(#2507) for both transmission and reception. In case the value of Tx field is 0, then the IEEE 802.1X component may configure the temporal key derived from the KDE into tis IEEE 802.11 MAC(#2507) for reception only. The Link ID field may indicate the link (e.g., the operating class and the primary channel number) for the GTK being installed. The Key RSC field may contain the receive sequence counter for the GTK being installed on the link indicated by the Link ID field. Delivery of the RSC field value may allow a STA to identify replayed MAC protocol data units (MPDUs) on the link indicated by the Link ID field. In case the RSC field value is less than 8 octets in length, then the remaining octets may be set to 0. The least significant octet of the transmit sequence counter (TSC) or packet number (PN) may be in the first octet of the RSC field.

Figure 7:
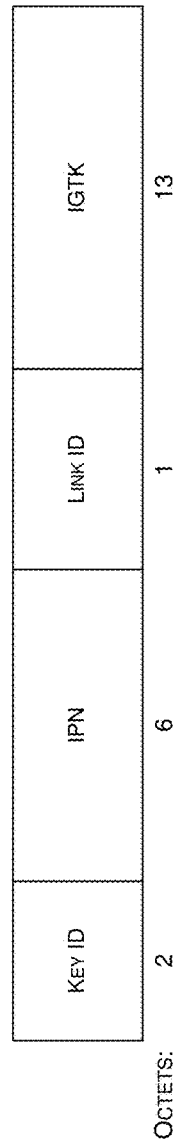
FIG. 7 is a diagram of an example design in accordance with an implementation of the present disclosure.

FIG. 7 illustrates an example design 700 of a Multi-Link IGTK KDE element under a proposed scheme in accordance with the present disclosure. Referring to FIG. 7, the Multi-Link IGTK KDE element may include a number of fields including, for example, a Key ID field, an IPN field, a Link ID field, and an IGTK field. The Key ID field may indicate the value of the IGTK key identifier. The Link ID field may indicate the link (e.g., the operating class and the primary channel number) for the IGTK being installed. The IPN field may correspond to the last packet number used by a broadcast/multicast transmitter on the link indicated by the Link ID field, and it may be used by a receiver as the initial value for a Broadcast Integrity Protocol (BIP) replay counter for the IGTK.

Figure 8:
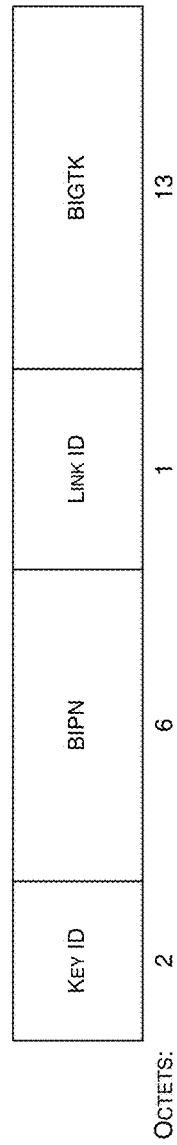
FIG. 8 is a diagram of an example design in accordance with an implementation of the present disclosure.

FIG. 8 illustrates an example design 800 of a Multi-Link BIGTK KDE element under a proposed scheme in accordance with the present disclosure. Referring to FIG. 8, the Multi-Link BIGTK KDE element may include a number of fields including, for example, a Key ID field, a BIPN field, a Link ID field, and a BIGTK field. The Key ID field may indicate the value of the BIGTK key identifier. The Link ID field may indicate the link (e.g., the operating class and the primary channel number) for the BIGTK being installed. The BIPN field may correspond to the BIPN value that was carried in the Management Message Integrity Check (MIC) element (MME) of the last protected Beacon frame on the link indicated by the Link ID field, and it may be used by the receiver as the initial value for the BIP replay counter for the BIGTK.

Under a proposed scheme in accordance with the present disclosure, for FILS Shared Key authentication and FILS Public Key authentication when using PMKSA caching, the KeyAuth field of the FILS Key Confirmation element may be constructed by using the HMAC mode of the negotiated hash algorithm with a key of ICK on a concatenation of the AP MLD's nonce, the STA MLD's nonce, the AP MLD MAC address, the STA MLD MAC address, and conditionally the AP MLD's public Diffie-Hellman value and the STA MLD's public Diffie-Hellman value, in that order and as follows:

Key-Auth=HMAC-Hash (ICK, ANonce||SNonce||AP-MLD-MAC||STA-MLD-MAC [||gAP||gSTA])

Here, Hash denotes the hash algorithm specific to the negotiated AKM, ANonce denotes the AP MLD's nonce, SNonce denotes the STA MLD's nonce, AP-MLD-MAC denotes the MLD MAC address of the AP MLD, STA-MLD-MAC denotes the MLD MAC address of the STA MLD, gAP denotes the AP MLD's Diffie-Hellman public value, gSTA denotes the STA MLD's Diffie-Hellman public value, and the brackets indicate the inclusion of the Diffie-Hellman public values when performing PFS with FILS Shared Key authentication. There may be no Diffie-Hellman public values to include otherwise.

Under the proposed scheme, for FILS Public Key authentication when PMKSA caching is not used, the KeyAuth field of the FILS Key Confirmation element may be a digital signature using the AP MLD's private key of the output from the negotiated hash algorithm on a concatenation of the AP MLD's public Diffie-Hellman value, the STA MLD's public Diffie-Hellman value, the AP MLD's nonce, the STA MLD's nonce, the AP MLD MAC address, and the STA MLD MAC address, in that order. The specific construction of the digital signature may depend on the cryptography system of the public/private key pair as follows:

Key-Auth=Sig-AP (gAP||gSTA||ANonce||SNonce||AP-MLD-MAC||STA-MLD-MAC)

Here, Sig-AP( ) may indicate a digital signature using the AP MLD's private key analog to the AP MLD's trusted public key. The form of signature may depend on the type of public key used by the AP MLD (IETF RFC 3447 for RSA, FIPS 186-4 for DSA, and ISO/IEC 14883-3 for ECDSA). The data to be signed may be first hashed and the hash algorithm used with the appropriate digital signature algorithm may be specific to the negotiated AKM.

Under a proposed scheme in accordance with the present disclosure, the (Re)Association Response frame may be encrypted using the AEAD algorithm (e.g., as defined in Section 12.12.2.7 (AEAD cipher mode for FILS) of the IEEE Specification) with the KEK as the key. The AAD used with the AEAD algorithm for the (Re)Association Response frame may include the following data passed as separate components in the following order: AP's BSSID, STA's MAC address, AP's nonce, STA's nonce, and the contents of the (Re)Association Response frame from the Capability Information field (inclusive) to the FILS Session element (inclusive). Additionally, the AAD used with the AEAD algorithm for the Association Response frame may include STA MLD MAC address and AP MLD MAC address. The plaintext passed to the AEAD algorithm may be the data that would follow the FILS Session element in an unencrypted frame body. The output of the AEAD algorithm may become the data that follows the FILS Session element in the encrypted and authenticated (Re)Association Response frame. The output of the algorithm may be as specified in IETF RFC 5116. The resulting (Re)Association Response frame may be transmitted to the STA MLD.

Under the proposed scheme, the STA MLD may decrypt and verify the received (Re)Association Response frame with the AEAD algorithm (e.g., as defined in Section 12.12.2.5 (Key establishment with FILS authentication) of the IEEE Specification) with the KEK as the key. The AAD may be reconstructed as defined in the subclause above and may be passed with the ciphertext of the received frame to the AEAD decryption operation. The STA MLD may compare the FILS Session of the received frame with the FILS Session the STA MLD selected to identify the FILS session. In case they differ, authentication fails. In case the output from the AEAD decryption operation returns failure, the authentication exchange fails. In case the output does not return failure, the output plaintext may replace the ciphertext as portion of the frame body that follows the FILS Session element and processing of the received frame may continue by checking the value of the FILS Key Confirmation element. The STA MLD may verify that the RSNE received in the (Re)Association Response frame has identical AKM suites and cipher suites and RSN capabilities as were included in the RSNE in the Beacon, Probe Response, and Authentication frames from the AP MLD. In case these fields differ, authentication fails.

Under the proposed scheme, for FILS Shared Key authentication, the STA MLD may construct a verifier, Key-Auth', in an identical manner as the AP constructed its Key-Auth above. The STA MLD may compare Key-Auth' with the KeyAuth field in the FILS Key Confirmation element of the received frame. In case they differ, authentication fails. For FILS Public Key authentication, the STA MLD may use the AP MLD's (certified) public key from the FILS Public Key element to verify that the signature contained in the Key-Auth field corresponds to the purported signature by the AP over the concatenation of the following, in that order and according to the signature scheme used: AP's public Diffie-Hellman value (gAP), STA's public Diffie-Hellman value (gSTA), AP's nonce (ANonce), STA's nonce (SNonce), AP's BSSID (AP-BSSID), and STA's MAC address (STA-MAC). Furthermore, the AP MLD may check all certificates in the certificate chain, both cryptographically and from a security policy perspective, according to the procedures for checking certificates and certificate chains in IETF RFC 5280. In case any of these verifications fail, authentication fails.

Under the proposed scheme, in case authentication is deemed a failure, the ICK, KEK, PMK, and TK may be irretrievably deleted and the STA MLD shall abandon the exchange. Otherwise, authentication succeeds and the STA MLD and AP MLD may irretrievably delete the nonpersistent secret keying material that is created by executing the key establishment with FILS Shared Key authentication scheme (e.g., as per Section 12.12.2.3 (Key establishment with FILS Shared Key authentication) of the IEEE Specification) or the key establishment with FILS Public Key authentication scheme (e.g., as per Section 12.12.2.4 (Key establishment with FILS Public Key authentication) of the IEEE Specification). The KEK and PMK may be used for subsequent key management (e.g., as specified in Section 12.6 (RSNA security association management) of the IEEE Specification). In case the lifetime of the rMSK is known, the STA MLD and AP MLD may set the lifetime of the PMKSA to the lifetime of the rMSK. Otherwise, the STA MLD and AP MLD may set the lifetime of the PMKSA to the value dot11RSNAConfigPMKLifetime. Upon successful completion of the FILS authentication procedure, the STA MLD may process the Key Delivery element in the (Re)Association Response frame. The STA MLD may install the GTK and key RSC, and IGTK and IPN for each link of the multiple links in case management frame protection is enabled, and BIGTK and BIPN for each link of the multiple links in case present in the key delivery element and dot11BeaconProtectionEnabled is true.

FIG. 9 illustrates an example design 900 of a Robust Security Network (RSN) Capabilities field under a proposed scheme in accordance with the present disclosure. Referring to FIG. 9, the RSN Capabilities field may contain a number of subfields including an Extended Key ID for Individually Addressed Frames subfield. The Extended Key ID for Individually Addressed Frames subfield (located at bit 13, or B13, of the RSN Capabilities field) may be set to 1 to indicate that the STA supports Key ID values in the range 0~1 for a PTKSA when the cipher suite is Cipher Block Chaining Message Authentication Code Protocol (CCMP) or Galois/Counter Mode Protocol (GCMP). Bit 13 may be set to 0 to indicate that the STA only supports Key ID 0 for a PTKSA.

Under a proposed scheme in accordance with the present disclosure with respect to Robust Security Network Association (RSNA) rekeying, when both ends of a link support extended Key IDs for individually addressed frames, a new PTKSA may be installed without data loss, provided that the new PTKSA uses a different Key ID from the old PTKSA. It is noteworthy that data loss might occur if the same Key ID is used because it is not possible to precisely coordinate (due to software processing delays) when the new key is used for transmission at one end and when it is applied to receive at the other end. In case a different Key ID is used for the new PTKSA, provided that the new key is installed at the receive side prior to its first use at the transmit side, there may be no need for precise coordination. During the transition, received packets may be unambiguously identified using the Key ID as belonging to either the old or new PTKSA.

Under the proposed scheme, in case the Extended Key ID for Individually Addressed Frames subfield of the RSN Capabilities field is 1 for both the Authenticator and the Supplicant, then the Authenticator may assign a new Key ID for the PTKSA in the range of 0~1 that is different from the Key ID assigned in the previous handshake and, additionally, the Authenticator may use the MLMESETKEYS.request primitive to install the new key to receive individually addressed MPDUs protected by the PTK with the assigned Key ID. Otherwise, Key ID 0 may be used and installation of the key may be deferred until after message 4 has been received. The Authenticator may send message 3 to the Supplicant. It is noteworthy that, in case an existing PTK is still in effect, the Authenticator IEEE 802.11 MAC may continue to transmit protected, individually addressed MPDUs (if any) using the existing key. With the installation of the new key for receive, the Authenticator may be able to receive protected, individually addressed MPDUs using either the old key (if present) or the new key.

Figure 10:
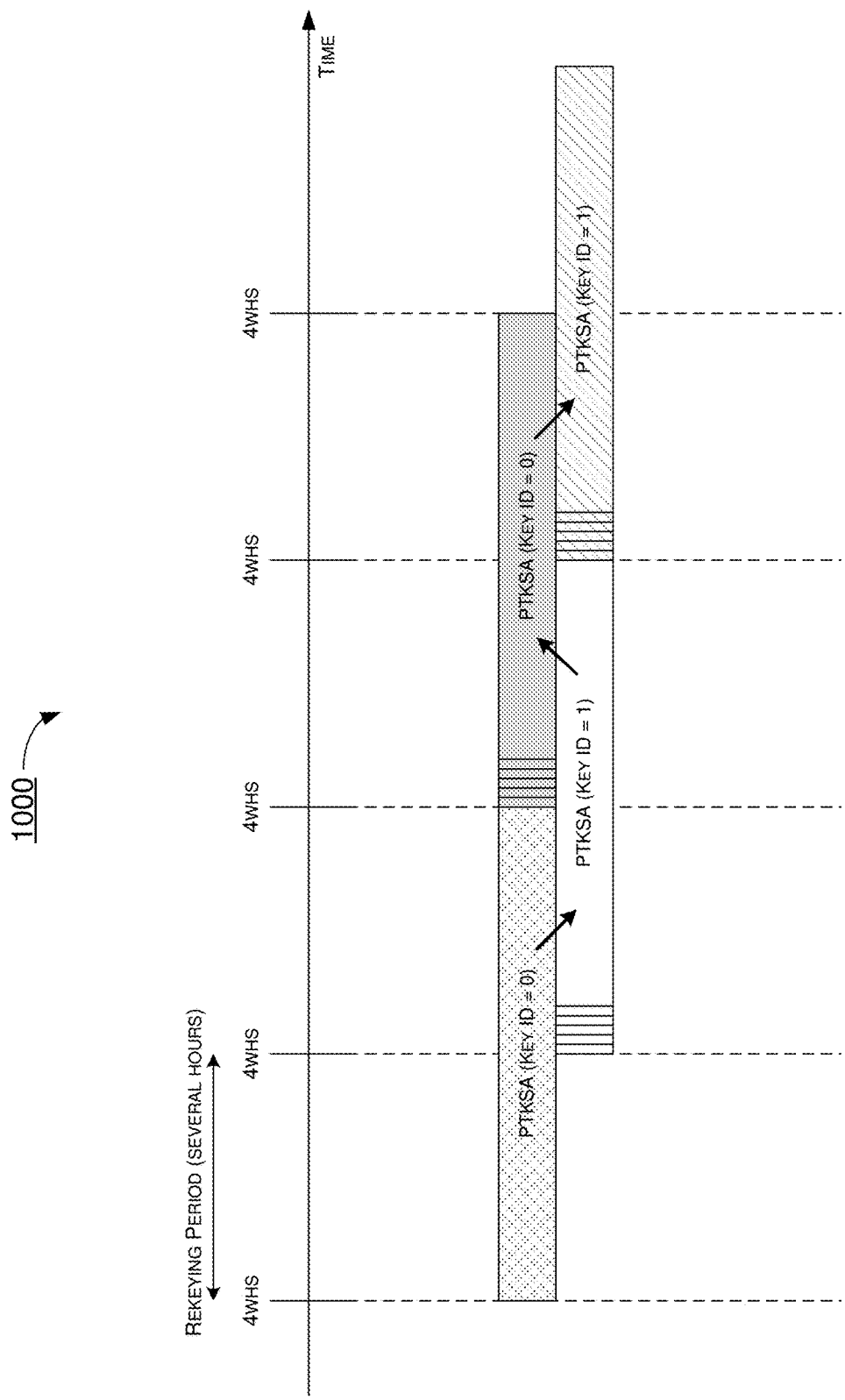
FIG. 10 is a diagram of an example scenario in accordance with an implementation of the present disclosure.

FIG. 10 illustrates an example scenario 1000 of RSNA rekeying under the proposed scheme. Referring to FIG. 10, RSNA rekeying procedure may use two keys. In scenario 1000, keys may remain in place (for receive processing) for two handshake periods. PTKSA lifetime may be two handshake periods. New key installation may replace an old key with the same Key ID. Accordingly, have two active keys may permit a smooth, timing-relaxed transition from one PTKSA to the next.

Under a proposed scheme in accordance with the present disclosure with respect to CCMP encapsulation, the PN values may sequentially number each MPDU. Each transmitter may maintain a single PN (e.g., a 48-bit counter) for each PTKSA and Group Temporal Key Security Association (GTKSA). The PN may be implemented as a 48-bit value strictly increasing integer, initialized to 1 when the corresponding temporal key is initialized or refreshed.

Under a proposed scheme in accordance with the present disclosure with respect to GCMP encapsulation, the PN values may sequentially number each MPDU. Each transmitter may maintain a single PN (e.g., a 48-bit counter) for each PTKSA and GTKSA. The PN may be implemented as a 48-bit value strictly increasing integer, initialized to 1 when the corresponding temporal key is initialized or refreshed.

Under a proposed scheme in accordance with the present disclosure with respect to RSNA rekeying in multi-link operation, when a STA (e.g., STA 110) re-encrypts a frame for retransmission on the same link or a different link, the STA may set the Key ID field in the CCMP or GCMP header to a value that is the same as the value of the Key ID field of a first transmitted MPDU. Otherwise, because the PN spaces of the different Key IDs are different, the replay detection may encounter difficulty.

Illustrative Implementations

Figure 11:
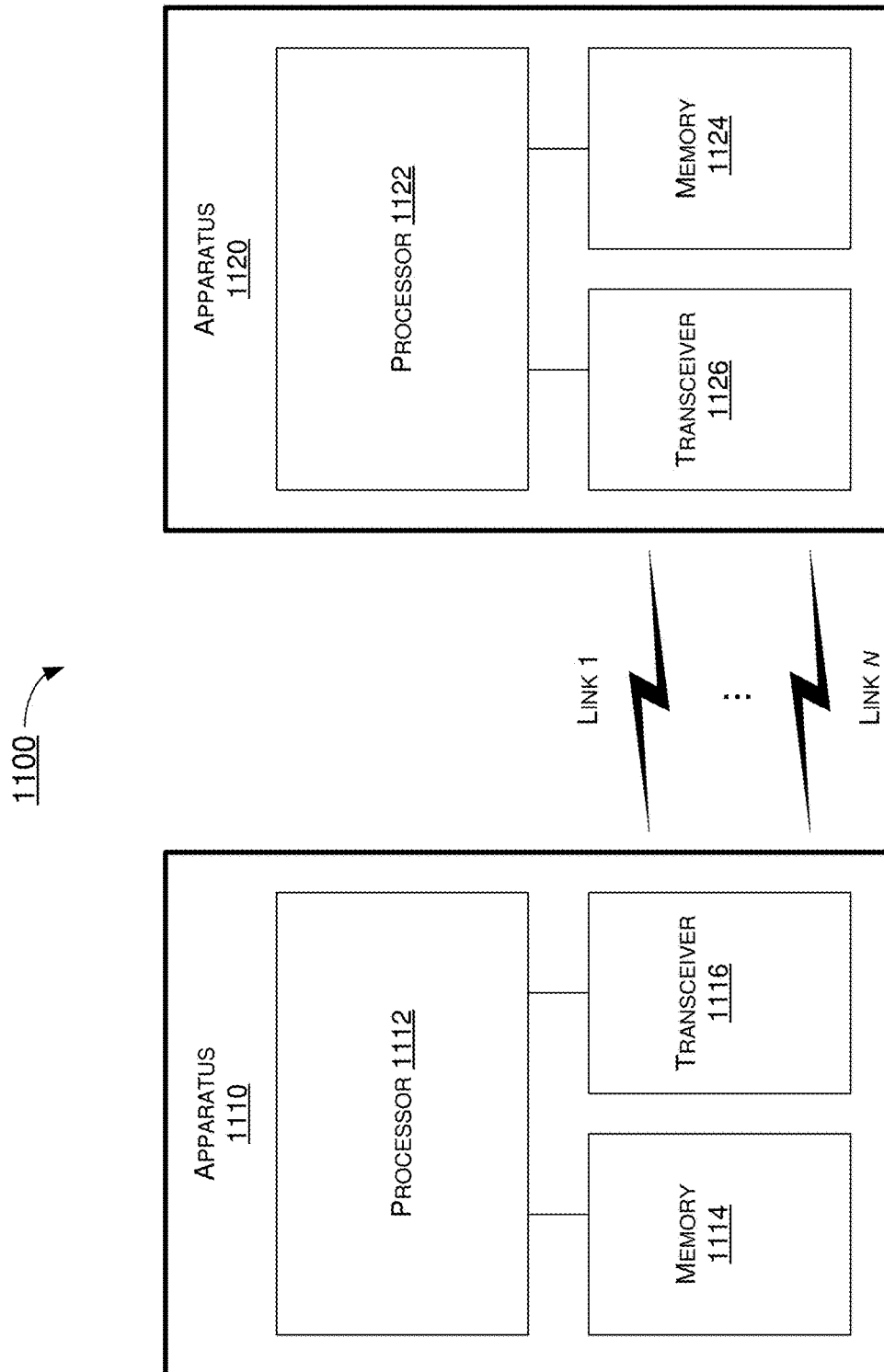
FIG. 11 is a block diagram of an example communication system in accordance with an implementation of the present disclosure.

FIG. 11 illustrates an example system 1100 having at least an example apparatus 1110 and an example apparatus 1120 in accordance with an implementation of the present disclosure. Each of apparatus 1110 and apparatus 1120 may perform various functions to implement schemes, techniques, processes and methods described herein pertaining to EHT FILS support in multi-link operation in wireless communications, including the various schemes described above with respect to various proposed designs, concepts, schemes, systems and methods described above as well as processes described below. For instance, apparatus 1110 may be an example implementation of STA 110, and apparatus 1120 may be an example implementation of STA 120.

Each of apparatus 1110 and apparatus 1120 may be a part of an electronic apparatus, which may be a STA or an AP, such as a portable or mobile apparatus, a wearable apparatus, a wireless communication apparatus or a computing apparatus. For instance, each of apparatus 1110 and apparatus 1120 may be implemented in a smartphone, a smart watch, a personal digital assistant, a digital camera, or a computing equipment such as a tablet computer, a laptop computer or a notebook computer. Each of apparatus 1110 and apparatus 1120 may also be a part of a machine type apparatus, which may be an IoT apparatus such as an immobile or a stationary apparatus, a home apparatus, a wire communication apparatus or a computing apparatus. For instance, each of apparatus 1110 and apparatus 1120 may be implemented in a smart thermostat, a smart fridge, a smart door lock, a wireless speaker or a home control center. When implemented in or as a network apparatus, apparatus 1110 and/or apparatus 1120 may be implemented in a network node, such as an AP in a WLAN.

In some implementations, each of apparatus 1110 and apparatus 1120 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 1110 and apparatus 1120 may be implemented in or as a STA or an AP. Each of apparatus 1110 and apparatus 1120 may include at least some of those components shown in FIG. 11 such as a processor 1112 and a processor 1122, respectively, for example. Each of apparatus 1110 and apparatus 1120 may further include one or more other components not pertinent to the proposed scheme of the present disclosure (e.g., internal power supply, display device and/or user interface device), and, thus, such component(s) of apparatus 1110 and apparatus 1120 are neither shown in FIG. 11 nor described below in the interest of simplicity and brevity.

In one aspect, each of processor 1112 and processor 1122 may be implemented in the form of one or more single-core processors, one or more multi-core processors, one or more RISC processors or one or more CISC processors. That is, even though a singular term "a processor" is used herein to refer to processor 1112 and processor 1122, each of processor 1112 and processor 1122 may include multiple processors in some implementations and a single processor in other implementations in accordance with the present disclosure. In another aspect, each of processor 1112 and processor 1122 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1112 and processor 1122 is a special-purpose machine specifically designed, arranged and configured to perform specific tasks including those pertaining to EHT FILS support in multi-link operation in wireless communications in accordance with various implementations of the present disclosure.

In some implementations, apparatus 1110 may also include a transceiver 1116 coupled to processor 1112. Transceiver 1116 may be capable of wirelessly transmitting and receiving data. In some implementations, apparatus 1120 may also include a transceiver 1126 coupled to processor 1122. Transceiver 1126 may include a transceiver capable of wirelessly transmitting and receiving data. Transceiver 1116 of apparatus 1110 and transceiver 1126 of apparatus 1120 may communicate each other over one or more of multiple links link 1~link N, with N>1, such as a first link and a second link.

In some implementations, apparatus 1110 may further include a memory 1114 coupled to processor 1112 and capable of being accessed by processor 1112 and storing data therein. In some implementations, apparatus 1120 may further include a memory 1124 coupled to processor 1122 and capable of being accessed by processor 1122 and storing data therein. Each of memory 1114 and memory 1124 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 1114 and memory 1124 may include a type of read-only memory (ROM) such as mask ROM, programmable ROM (PROM), erasable programmable ROM (EPROM) and/or electrically erasable programmable ROM (EEPROM). Alternatively, or additionally, each of memory 1114 and memory 1124 may include a type of non-volatile random-access memory (NVRAM) such as flash memory, solid-state memory, ferroelectric RAM (FeRAM), magnetoresistive RAM (MRAM) and/or phase-change memory.

Each of apparatus 1110 and apparatus 1120 may be a communication entity capable of communicating with each other using various proposed schemes in accordance with the present disclosure. For illustrative purposes and without limitation, a description of capabilities of apparatus 1110, as STA 110 which may be a constrained non-AP MLD, and apparatus 1120, as STA 120 which may be a constrained AP MLD, is provided below. It is noteworthy that, although the example implementations described below are provided in the context of WLAN, the same may be implemented in other types of networks.

Under a proposed scheme with respect to EHT FILS support in multi-link operation in wireless communications in accordance with the present disclosure, each of processor 1112 of apparatus 1110 and processor 1122 of apparatus 1120, implemented in a non-AP STA MLD and an AP MLD, respectively, may perform a FILS procedure to establish wireless communications between the AP MLD and the non-AP STA MLD over a plurality of links. Moreover, each of processor 1112 of apparatus 1110 and processor 1122 of apparatus 1120 may communicate over one or more links of the plurality of links upon completion of the FILS procedure.

In some implementations, a FILS Discovery frame transmitted in the FILS procedure may indicate whether a SSID of the AP MLD is different from a SSID of an AP of a plurality of APs in the AP MLD transmitting the FILS Discovery frame.

In some implementations, a Multiple Links Presence Indicator subfield in a FD Capability subfield in a FILS Discovery Information field of the FILS Discovery frame may be set to 1 to indicate that the SSID of the AP MLD is different from the SSID of the AP of the plurality of APs in the AP MLD transmitting the FILS Discovery frame. In some implementations, in an event that the Multiple Links Presence Indicator subfield is set to 1, the FILS Discovery Information field may also include a Short MLD SSID subfield containing a 4-octet short SSID of the AP MLD.

In some implementations, in performing the FILS procedure, processor 1112, implemented in the non-AP STA MLD, may perform an association or reassociation procedure with HLP encapsulation by: (a) constructing a FILS HLP Container element to form a HLP packet; and (b) transmitting the FILS HLP Container element in an association or reassociation request frame to the AP MLD. In some implementations, the FILS HLP Container element may include a destination MAC address, a source MAC address, and the HLP packet in an MSDU format. Moreover, the source MAC address may include or may be an MLD MAC address of the non-AP STA MLD.

In some implementations, in performing the FILS procedure, processor 1122, implemented in the AP MLD, may receive and decapsulate the HLP packet by: (a) extracting the destination MAC address, the source MAC address, and the HLP packet from the FILS HLP Container element; (b) determining whether the extracted source MAC address matches the MLD MAC address of the non-AP STA MLD associated with the source MAC address of the association or reassociation request frame; and (c) responsive to determining that the extracted source MAC address matches the MLD MAC address of the non-AP STA MLD: (i) constructing a frame containing the HLP packet; and (ii) delivering the frame to an upstream network or a BSS. Moreover, processor 1122 may discard the FILS HLP Container element responsive to determining that the extracted source MAC address does not match the MLD MAC address of the non-AP STA MLD.

In some implementations, in performing the FILS procedure, each of processor 1112 and processor 1122, implemented in the non-AP STA MLD and the AP MLD, respectively, may perform an authentication procedure with one public key across the plurality of links by the plurality of APs in the AP MLD and by a plurality of STAs in the non-AP STA MLD across the plurality of links. In some implementations, Diffie-Hellman values in the plurality of APs in the AP MLD may be common across the plurality of links. Similarly, Diffie-Hellman values in the plurality of STAs in the non-AP STA MLD may be common across the plurality of links.

In some implementations, in performing the FILS procedure, each of processor 1112 and processor 1122, implemented in the non-AP STA MLD and the AP MLD, respectively, may perform an authentication procedure using a PMK and a PMKID. In some implementations, each of the PMK and PMKID may be generated using MLD-level information related to the AP MLD and the non-AP STA MLD.

In some implementations, in performing the FILS procedure, processor 1112, implemented in the non-AP STA MLD, may perform an authentication procedure by: (a) generating an authentication frame by: (i) encoding an MLD MAC address of the non-AP STA MLD which is a WM MAC address for each link of one or more supported links among the plurality of links; and (ii) including the encoded MAC address in a Multiple Link Address element of the authentication frame; and (b) transmitting the authentication frame to the AP MLD.

In some implementations, in performing the FILS procedure, processor 1122, implemented in the AP MLD, may perform an authentication procedure by: (a) generating an authentication frame by: (i) encoding an MLD MAC address of the AP MLD which is a WM MAC address for each link of one or more supported links among the plurality of links; and (ii) including the encoded MAC address in a Multiple Link Address element of the authentication frame; and (b) transmitting the authentication frame to the non-AP STA MLD.

In some implementations, in performing the FILS procedure, processor 1122, implemented in the AP MLD, may perform an association or reassociation procedure by: (a) generating an association or reassociation response frame by constructing a Key Delivery element indicating: (i) a current GTK and key RSC associated with each link of the plurality of links, (ii) a current IGTK and IPN associated with each link of the plurality of links in an event that management frame protection is enabled, and (iii) a current BIGTK and BIPN associated with each link of the plurality of links in an event that beacon protection is enabled; and (b) transmitting the association or reassociation response frame to the non-AP STA MLD. In some implementations, the Key Delivery element may contain a KDE List field comprising a multi-link GTK KDE, a multi-link IGTK KDE, and a multi-link BIGTK KDE associated with each link of one or more links among the plurality of links on which the Key Delivery element is transmitted.

In some implementations, the multi-link GTK KDE may include: (i) a Key ID field indicating a value of a GTK key identifier, (ii) a Transmit field indicating a link on which the GTK is transmitted, (iii) a Link ID field indicating a link on which the GTK is being installed, and (iv) a Key RSC field containing a RSC for the GTK being installed on the link indicated by the Link ID field. In some implementations, the GTK key identifier may be MLD-level for the AP MLD and the non-AP STA MLD supporting a same key identifier.

In some implementations, the multi-link IGTK KDE may include: (i) a Key ID field indicating a value of an IGTK key identifier, (ii) a Link ID field indicating a link on which the IGTK is being installed, and (iii) an IPN field corresponding to a last packet number used by a transmitter on the link indicated by the Link ID field and used by a receiver as an initial value for a BIP replay counter for the IGTK. In some implementations, the IGTK key identifier may be MLD-level for the AP MLD and the non-AP STA MLD supporting a same key identifier.

In some implementations, the multi-link BIGTK KDE may include: (i) a Key ID field indicating a value of an BIGTK key identifier, (ii) a Link ID field indicating a link on which the BIGTK is being installed, and (iii) a BIPN field corresponding to a BIPN value carried in a MME of a last protected beacon frame on the link indicated by the Link ID field and used by a receiver as an initial value for a BIP replay counter for the BIGTK. In some implementations, the BIGTK key identifier may be MLD-level for the AP MLD and the non-AP STA MLD supporting a same key identifier.

In some implementations, in communicating, each of processor 1112 and processor 1122 transmitting or receiving, via transceiver 1116 or transceiver 1126, respective, a retransmitted frame with a Key ID field in a CCMP or GCMP header of the frame being equal to a Key ID field of a first transmitted MPDU.

Illustrative Processes

FIG. 12 illustrates an example process 1200 in accordance with an implementation of the present disclosure. Process 1200 may represent an aspect of implementing various proposed designs, concepts, schemes, systems and methods described above. More specifically, process 1200 may represent an aspect of the proposed concepts and schemes pertaining to EHT FILS support in multi-link operation in wireless communications in accordance with the present disclosure. Process 1200 may include one or more operations, actions, or functions as illustrated by one or more of blocks 1210 and 1220. Although illustrated as discrete blocks, various blocks of process 1200 may be divided into additional blocks, combined into fewer blocks, or eliminated, depending on the desired implementation. Moreover, the blocks/sub-blocks of process 1200 may be executed in the order shown in FIG. 12 or, alternatively in a different order. Furthermore, one or more of the blocks/sub-blocks of process 1200 may be executed repeatedly or iteratively. Process 1200 may be implemented by or in apparatus 1110 and apparatus 1120 as well as any variations thereof. Solely for illustrative purposes and without limiting the scope, process 1200 is described below in the context of apparatus 1110 as STA 110 (e.g., a STA or AP) and apparatus 1120 as STA 120 (e.g., a peer STA or AP) of a wireless network such as a WLAN in accordance with one or more of IEEE 802.11 standards. Process 1200 may begin at block 1210.

At 1210, process 1200 may involve each of apparatus 1110 and apparatus 1120, implemented in a non-AP STA MLD and an AP MLD, respectively, performing a FILS procedure to establish wireless communications between the AP MLD and the non-AP STA MLD over a plurality of links. Process 1200 may proceed from 1210 to 1220.

At 1220, process 1200 may involve each of apparatus 1110 and apparatus 1120 communicating over one or more links of the plurality of links upon completion of the FILS procedure.

In some implementations, a FILS Discovery frame transmitted in the FILS procedure may indicate whether a SSID of the AP MLD is different from a SSID of an AP of a plurality of APs in the AP MLD transmitting the FILS Discovery frame.

In some implementations, a Multiple Links Presence Indicator subfield in a FD Capability subfield in a FILS Discovery Information field of the FILS Discovery frame may be set to 1 to indicate that the SSID of the AP MLD is different from the SSID of the AP of the plurality of APs in the AP MLD transmitting the FILS Discovery frame. In some implementations, in an event that the Multiple Links Presence Indicator subfield is set to 1, the FILS Discovery Information field may also include a Short MLD SSID subfield containing a 4-octet short SSID of the AP MLD.

In some implementations, in performing the FILS procedure, process 1200 may involve the non-AP STA MLD performing an association or reassociation procedure with HLP encapsulation by: (a) constructing a FILS HLP Container element to form a HLP packet; and (b) transmitting the FILS HLP Container element in an association or reassociation request frame to the AP MLD. In some implementations, the FILS HLP Container element may include a destination MAC address, a source MAC address, and the HLP packet in an MSDU format. Moreover, the source MAC address may include or may be an MLD MAC address of the non-AP STA MLD.

In some implementations, in performing the FILS procedure, process 1200 may further involve the AP MLD receiving and decapsulating the HLP packet by: (a) extracting the destination MAC address, the source MAC address, and the HLP packet from the FILS HLP Container element; (b) determining whether the extracted source MAC address matches the MLD MAC address of the non-AP STA MLD associated with the source MAC address of the association or reassociation request frame; and (c) responsive to determining that the extracted source MAC address matches the MLD MAC address of the non-AP STA MLD: (i) constructing a frame containing the HLP packet; and (ii) delivering the frame to an upstream network or a BSS. Moreover, process 1200 may involve the AP MLD discarding the FILS HLP Container element responsive to determining that the extracted source MAC address does not match the MLD MAC address of the non-AP STA MLD.

In some implementations, in performing the FILS procedure, process 1200 may involve each of apparatus 1110 and apparatus 1120 performing an authentication procedure with one public key across the plurality of links by the plurality of APs in the AP MLD and by a plurality of STAs in the non-AP STA MLD across the plurality of links. In some implementations, Diffie-Hellman values in the plurality of APs in the AP MLD may be common across the plurality of links. Similarly, Diffie-Hellman values in the plurality of STAs in the non-AP STA MLD may be common across the plurality of links.

In some implementations, in performing the FILS procedure, process 1200 may involve each of apparatus 1110 and apparatus 1120 performing an authentication procedure using a PMK and a PMKID. In some implementations, each of the PMK and PMKID may be generated using MLD-level information related to the AP MLD and the non-AP STA MLD.

In some implementations, in performing the FILS procedure, process 1200 may involve apparatus 1110, implemented in the non-AP STA MLD, performing an authentication procedure by: (a) generating an authentication frame by: (i) encoding an MLD MAC address of the non-AP STA MLD which is a WM MAC address for each link of one or more supported links among the plurality of links; and (ii) including the encoded MAC address in a Multiple Link Address element of the authentication frame; and (b) transmitting the authentication frame to the AP MLD.

In some implementations, in performing the FILS procedure, process 1200 may involve apparatus 1120, implemented in the AP MLD, performing an authentication procedure by: (a) generating an authentication frame by: (i) encoding an MLD MAC address of the AP MLD which is a WM MAC address for each link of one or more supported links among the plurality of links; and (ii) including the encoded MAC address in a Multiple Link Address element of the authentication frame; and (b) transmitting the authentication frame to the non-AP STA MLD.

In some implementations, in performing the FILS procedure, process 1200 may involve apparatus 1120, implemented in the AP MLD, performing an association or reassociation procedure by: (a) generating an association or reassociation response frame by constructing a Key Delivery element indicating: (i) a current GTK and key RSC associated with each link of the plurality of links, (ii) a current IGTK and IPN associated with each link of the plurality of links in an event that management frame protection is enabled, and (iii) a current BIGTK and BIPN associated with each link of the plurality of links in an event that beacon protection is enabled; and (b) transmitting the association or reassociation response frame to the non-AP STA MLD. In some implementations, the Key Delivery element may contain a KDE List field comprising a multi-link GTK KDE, a multi-link IGTK KDE, and a multi-link BIGTK KDE associated with each link of one or more links among the plurality of links on which the Key Delivery element is transmitted.

In some implementations, the multi-link GTK KDE may include: (i) a Key ID field indicating a value of a GTK key identifier, (ii) a Transmit field indicating a link on which the GTK is transmitted, (iii) a Link ID field indicating a link on which the GTK is being installed, and (iv) a Key RSC field containing a RSC for the GTK being installed on the link indicated by the Link ID field. In some implementations, the GTK key identifier may be MLD-level for the AP MLD and the non-AP STA MLD supporting a same key identifier.

In some implementations, the multi-link IGTK KDE may include: (i) a Key ID field indicating a value of an IGTK key identifier, (ii) a Link ID field indicating a link on which the IGTK is being installed, and (iii) an IPN field corresponding to a last packet number used by a transmitter on the link indicated by the Link ID field and used by a receiver as an initial value for a BIP replay counter for the IGTK. In some implementations, the IGTK key identifier may be MLD-level for the AP MLD and the non-AP STA MLD supporting a same key identifier.

In some implementations, the multi-link BIGTK KDE may include: (i) a Key ID field indicating a value of an BIGTK key identifier, (ii) a Link ID field indicating a link on which the BIGTK is being installed, and (iii) a BIPN field corresponding to a BIPN value carried in a MME of a last protected beacon frame on the link indicated by the Link ID field and used by a receiver as an initial value for a BIP replay counter for the BIGTK. In some implementations, the BIGTK key identifier may be MLD-level for the AP MLD and the non-AP STA MLD supporting a same key identifier.

In some implementations, in communicating, process 1200 may involve each of apparatus 1110 and apparatus 1120 transmitting or receiving a retransmitted frame with a Key ID field in a CCMP or GCMP header of the frame being equal to a Key ID field of a first transmitted MPDU.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
performing a fast initial link setup (FILS) procedure to establish wireless communications between an access point (AP) multi-link device (MLD) and a non-AP station (STA) MLD over a plurality of links; and
communicating over one or more links of the plurality of links upon completion of the FILS procedure,
wherein the communicating comprises communicating a retransmitted frame with a Key identifier (ID) field in a Galois/Counter Mode Protocol (GCMP) header of the frame being equal to a Key ID field of a first transmitted medium access control (MAC) protocol data unit (MPDU), and
wherein the performing of the FILS procedure comprises the AP MLD performing an association or reassociation procedure by:

generating an association or reassociation response frame by constructing a Key Delivery element indicating:
- a current group temporal key (GTK) and key receive sequence counter (RSC) associated with each link of the plurality of links,
- a current integrity group temporal key (IGTK) and IGTK packet number (IPN) associated with each link of the plurality of links in an event that management frame protection is enabled, and
- a current beacon integrity group temporal key (BIGTK) and BIGTK packet number (BIPN) associated with each link of the plurality of links in an event that beacon protection is enabled; and transmitting the association or reassociation response frame to the non-AP STA MLD.

2. The method of claim 1, wherein a Multiple Links Presence Indicator subfield of a FILS Discovery frame transmitted in the FILS procedure indicates whether an SSID of the AP MLD is different from the SSID of the AP of the plurality of APs in the AP MLD transmitting the FILS Discovery frame.

3. The method of claim 2, wherein a FILS Discovery Information field that contains the Multiple Links Presence Indicator subfield further comprises a Short MLD SSID subfield containing a 4-octet short SSID of the AP MLD.

4. The method of claim 1, wherein the performing of the FILS procedure comprises the non-AP STA MLD performing the association or reassociation procedure with higher-layer protocol (HLP) encapsulation by:
constructing a FILS HLP Container element to form a HLP packet; and
transmitting the FILS HLP Container element in an association or reassociation request frame to the AP MLD,
wherein the FILS HLP Container element comprises a destination medium access control (MAC) address, a source MAC address, and the HLP packet in a MAC service data unit (MSDU) format, and
wherein the source MAC address comprises an MLD MAC address of the non-AP STA MLD.

5. The method of claim 4, wherein the performing of the FILS procedure further comprises the AP MLD receiving and decapsulating the HLP packet by:
extracting the destination MAC address, the source MAC address, and the HLP packet from the FILS HLP Container element;
determining whether the extracted source MAC address matches the MLD MAC address of the non-AP STA MLD associated with the source MAC address of the association or reassociation request frame; and
responsive to determining that the extracted source MAC address matches the MLD MAC address of the non-AP STA MLD:
constructing a frame containing the HLP packet; and
delivering the frame to an upstream network or a basic service set (BSS),
wherein the FILS HLP Container element is discarded by the AP MLD responsive to determining that the extracted source MAC address does not match the MLD MAC address of the non-AP STA MLD.

6. The method of claim 1, wherein the performing of the FILS procedure comprises performing an authentication procedure with one public key across the plurality of links by the plurality of APs in the AP MLD and by a plurality of STAs in the non-AP STA MLD across the plurality of links.

7. The method of claim 6, wherein Diffie-Hellman values in the plurality of APs in the AP MLD are common across the plurality of links, and wherein Diffie-Hellman values in the plurality of STAs in the non-AP STA MLD are common across the plurality of links.

8. The method of claim 1, wherein the performing of the FILS procedure comprises performing an authentication procedure using a pairwise master key (PMK) and a PMK identifier (PMKID), and wherein each of the PMK and PMKID is generated using MLD-level information related to the AP MLD and the non-AP STA MLD.

9. The method of claim 1, wherein the performing of the FILS procedure comprises the non-AP STA MLD performing an authentication procedure by:
generating an authentication frame by:
encoding an MLD medium access control (MAC) address of the non-AP STA MLD which is a wireless medium (WM) MAC address for each link of one or more supported links among the plurality of links; and
including the encoded MAC address in a Multiple Link Address element of the authentication frame; and
transmitting the authentication frame to the AP MLD.

10. The method of claim 1, wherein the performing of the FILS procedure comprises the AP MLD performing an authentication procedure by:
generating an authentication frame by:
encoding an MLD medium access control (MAC) address of the AP MLD which is a wireless medium (WM) MAC address for each link of one or more supported links among the plurality of links; and
including the encoded MAC address in a Multiple Link Address element of the authentication frame; and
transmitting the authentication frame to the non-AP STA MLD.

11. The method of claim 1,
wherein the Key Delivery element contains a key data encapsulation (KDE) List field comprising a multi-link GTK KDE, a multi-link IGTK KDE, and a multi-link BIGTK KDE associated with each link of one or more links among the plurality of links on which the Key Delivery element is transmitted.

12. The method of claim 11, wherein the multi-link GTK KDE comprises:
a Key identifier (ID) field indicating a value of a GTK key identifier,
a Transmit field indicating a link on which the GTK is transmitted,
a Link ID field indicating a link on which the GTK is being installed, and
a Key RSC field containing a RSC for the GTK being installed on the link indicated by the Link ID field,
wherein the GTK key identifier is MLD-level for the AP MLD and the non-AP STA MLD supporting a same key identifier.

13. The method of claim 11, wherein the multi-link IGTK KDE comprises:
a Key identifier (ID) field indicating a value of an IGTK key identifier,
a Link ID field indicating a link on which the IGTK is being installed, and
an IPN field corresponding to a last packet number used by a transmitter on the link indicated by the Link ID field and used by a receiver as an initial value for a Broadcast Integrity Protocol (BIP) replay counter for the IGTK,
wherein the IGTK key identifier is MLD-level for the AP MLD and the non-AP STA MLD supporting a same key identifier.

14. The method of claim 11, wherein the multi-link BIGTK KDE comprises:
- a Key identifier (ID) field indicating a value of an BIGTK key identifier,
- a Link ID field indicating a link on which the BIGTK is being installed, and
- a BIPN field corresponding to a BIPN value carried in a Management Message Integrity Check (MIC) element (MME) of a last protected beacon frame on the link indicated by the Link ID field and used by a receiver as an initial value for a Broadcast Integrity Protocol (BIP) replay counter for the BIGTK,
- wherein the BIGTK key identifier is MLD-level for the AP MLD and the non-AP STA MLD supporting a same key identifier.

15. An apparatus, comprising:
- a transceiver configured to communicate wirelessly; and
- a processor coupled to the transceiver and configured to perform operations comprising:
  - performing, via the transceiver, a fast initial link setup (FILS) procedure to establish wireless communications between an access point (AP) multi-link device (MLD) and a non-AP station (STA) MLD over a plurality of links; and
  - communicating, via the transceiver, over one or more links of the plurality of links upon completion of the FILS procedure,
- wherein, in communicating, the processor is configured to communicate a retransmitted frame with a Key identifier (ID) field in a Galois/Counter Mode Protocol (GCMP) header of the frame being equal to a Key ID field of a first transmitted medium access control (MAC) protocol data unit (MPDU), and
- wherein, in performing the FILS procedure, the processor, implemented in the AP MLD, performs an association or reassociation procedure by:
  - generating an association or reassociation response frame by constructing a Key Delivery element indicating:
    - a current group temporal key (GTK) and key receive sequence counter (RSC) associated with each link of the plurality of links,
    - a current integrity group temporal key (IGTK) and IGTK packet number (IPN) associated with each link of the plurality of links in an event that management frame protection is enabled, and
    - a current beacon integrity group temporal key (BIGTK) and BIGTK packet number (BIPN) associated with each link of the plurality of links in an event that beacon protection is enabled; and
  - transmitting the association or reassociation response frame to the non-AP STA MLD.

16. The apparatus of claim 15, wherein a Multiple Links Presence Indicator subfield of a FILS Discovery frame transmitted in the FILS procedure indicates whether the SSID of the AP MLD is different from the SSID of the AP of the plurality of APs in the AP MLD transmitting the FILS Discovery frame, and wherein a FILS Discovery Information field that contains the Multiple Links Presence Indicator subfield further comprises a Short MLD SSID subfield containing a 4-octet short SSID of the AP MLD.

17. The apparatus of claim 15, wherein:
- when implemented in the AP MLD, in performing the FILS procedure, the processor receives and decapsulating the HLP packet by:
  - extracting the destination MAC address, the source MAC address, and the HLP packet from the FILS HLP Container element;
  - determining whether the extracted source MAC address matches the MLD MAC address of the non-AP STA MLD associated with the source MAC address of the association or reassociation request frame; and
  - responsive to determining that the extracted source MAC address matches the MLD MAC address of the non-AP STA MLD:
    - constructing a frame containing the HLP packet; and
    - delivering the frame to an upstream network or a basic service set (BSS), or
  - responsive to determining that the extracted source MAC address does not match the MLD MAC address of the non-AP STA MLD, discarding the FILS HLP Container element.

18. The apparatus of claim 15, wherein, in performing the FILS procedure, the processor performs an authentication procedure with one public key across the plurality of links by the plurality of APs in the AP MLD and by a plurality of STAs in the non-AP STA MLD across the plurality of links, wherein Diffie-Hellman values in the plurality of APs in the AP MLD are common across the plurality of links, and wherein Diffie-Hellman values in the plurality of STAs in the non-AP STA MLD are common across the plurality of links.

19. The apparatus of claim 15,
- wherein the Key Delivery element contains a key data encapsulation (KDE) List field comprising a multi-link GTK KDE, a multi-link IGTK KDE, and a multi-link BIGTK KDE associated with each link of one or more links among the plurality of links on which the Key Delivery element is transmitted.

* * * * *